United States Patent [19]
Cain et al.

[11] Patent Number: 5,950,921
[45] Date of Patent: Sep. 14, 1999

[54] AGRICULTURAL LIQUID INJECTION PRODUCT APPLICATION PROCESS AND APPARATUS

[75] Inventors: John F. Cain, Marion; Christian D. Brinkley, Cedar Rapids, both of Iowa

[73] Assignee: Rockwell International Corporation, Costa Mesa, Calif.

[21] Appl. No.: 08/994,111

[22] Filed: Dec. 19, 1997

[51] Int. Cl.⁶ .......................... B05B 17/00; A01G 25/09; B67D 5/08

[52] U.S. Cl. ................. 239/1; 239/67; 239/69; 239/73; 239/172

[58] Field of Search ................. 239/1, 67, 69, 239/71, 73, 172

[56] References Cited

U.S. PATENT DOCUMENTS

| | | | |
|---|---|---|---|
| 4,630,773 | 12/1986 | Ortlip | 239/1 |
| 4,991,341 | 2/1991 | Douglas | 47/1.7 |
| 5,050,771 | 9/1991 | Hanson et al. | 239/1 X |
| 5,246,164 | 9/1993 | McCann et al. | 239/73 X |
| 5,653,389 | 8/1997 | Henderson et al. | 239/69 |
| 5,684,476 | 11/1997 | Anderson | 239/1 X |
| 5,704,546 | 1/1998 | Henderson et al. | 239/69 X |

*Primary Examiner*—Andres Kashnikow
*Assistant Examiner*—Robin O. Evans
*Attorney, Agent, or Firm*—Kyle Eppele; James P. O'Shaughnessy

[57] ABSTRACT

Provided are a method of and apparatus for applying a chemical to an agricultural field. A current position of chemical application equipment used to apply the chemical to the field is determined. A desired application rate for a first position a distance d ahead of the current position of the chemical application equipment is determined or retrieved from a data base containing a plurality of chemical application rates for the injector channels. The chemical application equipment is controlled, while the chemical application equipment is approximately at the current position, to change the chemical application rate from a current application rate to the desired application rate if the desired application rate is within a predetermined range, and to maintain the current application rate if the desired application rate is outside of the predetermined range, and for accurately recording chemical application rate and position data.

9 Claims, 3 Drawing Sheets

AGRICULTURAL LIQUID INJECTION PRODUCT APPLICATION PROCESS AND APPARATUS

FIELD OF THE INVENTION

The present invention relates to agricultural equipment for applying chemicals or other products to a field and for recording application data. More particularly, the present invention relates to an improved method of and apparatus for controlling the application of chemicals or other products to a field and for accurately recording chemical application rate and position data.

BACKGROUND OF THE INVENTION

Fields in which crops are planted rarely have a homogeneous soil composition. Different soil types have a different ability to retain water and nutrients. Also weeds and pests will distribute themselves in a non-uniform fashion across a field. Consequently, if uniform application of fertilizers, pesticides, herbicides, and water is carried out, there will be varied crop yield, pest control, weed control, fungus control, for example. This problem induced the development of customized soil and crop treatment, which has been a very high priority research area in the agricultural industry over the last decade.

Early attempts at customizing soil and crop treatment involved manual plotting of the field, monitoring of soil type and condition, and yield monitoring. Of late, field mapping has become substantially more sophisticated. Computer assisted mapping techniques, together with satellite tracking, are commonly used. However, using field maps to accurately apply chemicals or other materials to the field has proven to be a difficult task.

A general process by which chemicals are typically applied to a field is as follows. A carrier (usually water, or a tank mixed chemical and water) is pumped from a tank out to a boom where nozzles spray the carrier out onto the field. A carrier pump maintains pressure on the system out to the nozzles on the boom so that the nozzles will maintain their correct spray pattern. Additional chemicals are injected into the carrier flow on the low pressure side of the carrier pump. These chemicals are then mixed by the pump on the way to the boom sections. One problem associated with this type of system is that there is a delay between the time that the injected chemicals are injected into the carrier and the time that the carrier/chemical is sprayed from the nozzles on the boom. The injected chemicals must travel a certain distance C from the injection point to the nozzle. While the chemical travels this distance, the vehicle remains in motion. This presents problems when attempting to control application to a specific area. One way to address the problem caused by this delay is to "look ahead" of the application vehicle by the distance d and to control the current chemical injection rate based upon the application rate which is desired at the position corresponding to the distance d ahead of the vehicle's current position, while controlling the carrier rate at the current position.

The need to "look ahead" presents a problem at the field boundary for the injected chemicals. When approaching a boundary, the vehicle will look ahead to the area beyond the boundary and see a zero rate. The controller will therefore turn off the injection pumps a distance d before the boundary. As the vehicle approaches the boundary, the chemical from the carrier pump to the nozzles will spray out, leaving nothing but the carrier solution. When the vehicle then turns around, it will look ahead back into the prescription area of the field, see a non-zero injection rate, and command that rate. However, since the injected chemical has been sprayed out, there will then be a distance d where injected chemical will not be applied while the injected chemical travels between the carrier pump and the nozzles.

A second major problem associated with injection is the recording of data. When spraying chemicals with an injection based application system, the injected chemical is injected into the low pressure side of the pump. The chemical then must travel out to the sprayer tips to be applied. This results in a delay from the time that the injection pump is activated to the time that the chemical is actually applied. The time required for the product to travel from the injection pump to the nozzle tip is also specific to each vehicle type. Additionally, the speed the vehicle travels and the rate commanded for the carrier channel that the injected chemical travels in are not a constant and may vary from field to field. When combined with the injector pumps adjusting their rate as required by prescription and the vehicle look ahead leaving the field boundaries, accurate recording of georeferenced application rates becomes a problem.

SUMMARY OF THE INVENTION

Provided are a method of and apparatus for applying chemicals to an agricultural field and for recording application data. A current position of chemical application equipment used to apply the chemical to the field is determined. A desired application rate for the injected chemicals for a first position a distance d ahead of the current position of the chemical application equipment is determined or retrieved from a data base containing a plurality of chemical application rates. Simultaneously, a desired application rate at the current position of the chemical application equipment for the carrier fluid is determined or retrieved from a data base. The chemical application equipment is controlled, while the chemical application equipment is approximately at the current position, to change the chemical application rate from a current application rate to the desired application rate if the desired application rate is within a predetermined range, and to maintain the current application rate if the desired application rate is outside of the predetermined range. While at the current position of the chemical application equipment, the current position and the desired application rate for the injected chemicals for a second position a distance d behind the current position of the chemical are stored.

DETAILED DESCRIPTION OF THE PREFERRED EMBODIMENTS

Figure 1:
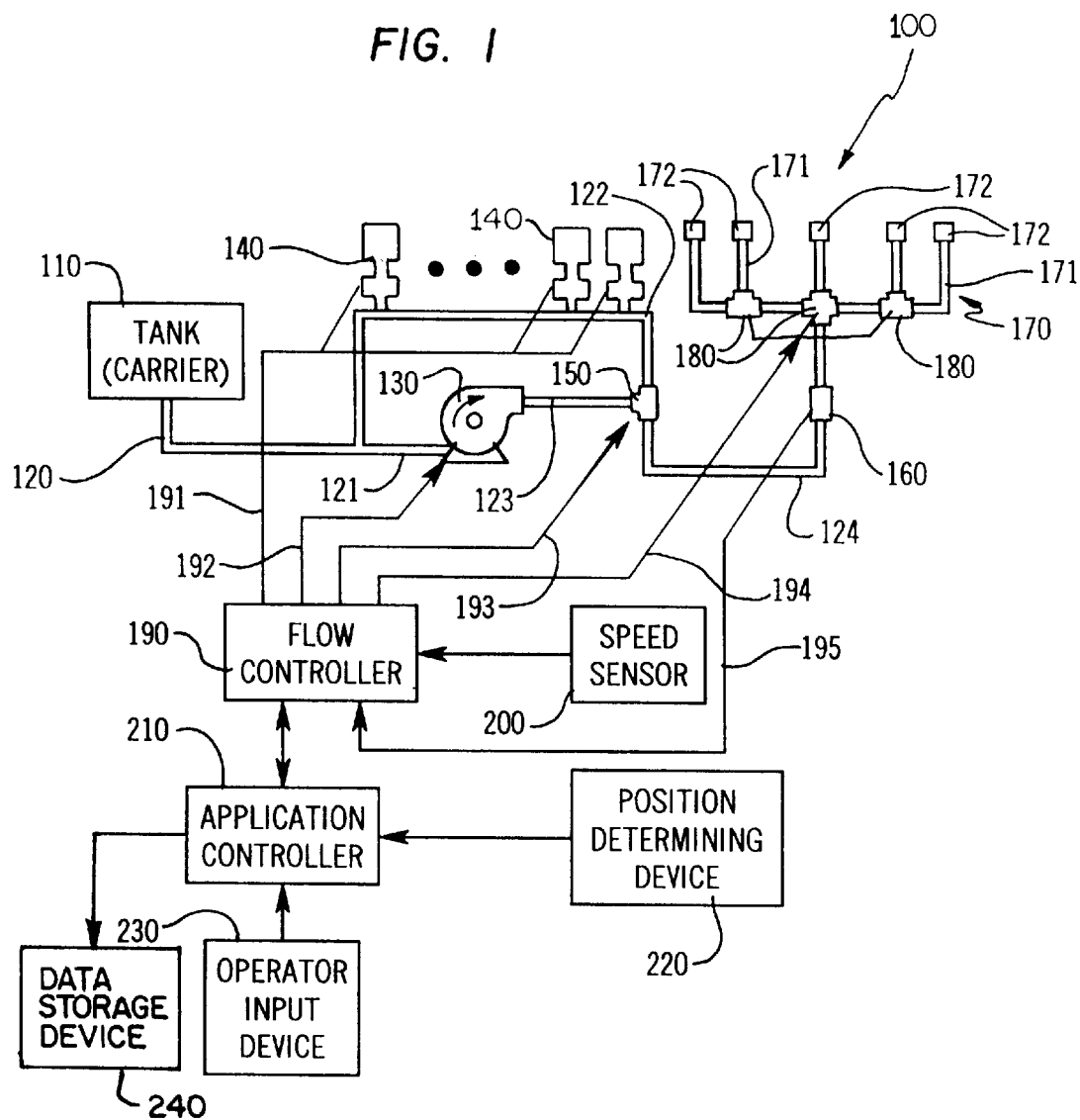
FIG. 1 is a block diagram illustrating an agricultural chemical application system in accordance with a preferred embodiment of the present invention.

FIG. 1 is a block diagram illustrating agricultural chemical application system 100 which can be embodied in either of a self propelled sprayer vehicle or a towed sprayer vehicle. System 100 includes tank 110 containing a carrier fluid, carrier fluid channel 120, carrier pump 130, chemical injectors or injection channels 140, flow control valve 150, flow meter 160, spray boom 170, boom valves 180, flow controller 190, speed sensor 200, application controller 210, position determining device 220, operator input device 230, and data storage device 240.

Carrier fluid path 120 includes sections 121 and 123 between which pump 130 is connected. Carrier fluid path 120 also includes section 122 in which chemical injectors 140 inject additional chemicals for application to the field, and section 124 which supplies the carrier fluid and chemicals to spray boom 170. Flow control valve 150 is controllable to aid in establishing and maintaining a desired carrier fluid and chemical application flow rate. Flow meter 160 is included in the carrier fluid flow path for sensing the flow rate of the carrier fluid and chemicals, and providing an output indicative of the sensed flow rate. Boom valves 180 are controllable to adjust the flow of carrier fluid and chemicals through boom sections 171 and spray nozzles 172 of boom 170. Valves 180 can be controlled to achieve a specific spray pattern of the boom sections, or to aid in controlling the application flow rate through these boom sections.

Position determining device 220 can be a GPS receiver or other known devices which accurately determine position. In one embodiment, position information is provided by position determining device 220 to application controller 210. Application controller 210 can also receive a "look ahead" distance d, for the particular application system or equipment, input by the user via input device 230. Based upon the position information and the look ahead distance, application controller 210 retrieves from a look-up table database desired chemical application rate information for the injected channels for various locations in the field.

Based upon the determined desired chemical application rates for particular positions in the field, application controller 210 generates control signals which are provided to flow controller 190. Using the control signals from application controller 210 and speed information from speed sensor 200, flow controller 190 generates control signals on control lines 191, 192, 193 and 194 to control various operations of chemical injectors 140, pump 130, flow control valve 150 and boom valves 180 to establish and maintain the desired application flow rates. Flow controller 190 also uses feedback from flow meter 160, provided via connection 195, to aid in establishing and maintaining the desired flow rates. In controlling these various components of system 100, flow controller 190 assures that desired quantities, or application rates, of chemicals are applied with the carrier fluid to specific portions of the field.

The general process by which chemicals are injected and controlled is as follows. A carrier (usually water, or a tank mixed chemical and water) is pumped from tank 110, through flow control valve 150 and flow meter 160 out to boom 170 where nozzles 172 spray out onto the field. The carrier pump 130 maintains pressure on the system out to the nozzles on the boom so the nozzles will maintain their correct spray pattern. Additional chemicals are injected on the low pressure side of the carrier pump 130. These chemicals are then mixed by the pump on the way to boom sections 171.

In order to define which areas in a field are to be sprayed with chemicals, a field prescription (Rx) map or database is generated. This Rx map contains the georeferenced chemical injection rates which are to be applied to the various areas of the field. In other words, an Rx map for the field is indicative of the desired chemical application rates for the prescription area of the field. As discussed below in greater detail, data storage device 240 is coupled to application controller 210 and stores chemical application rates correlated to the position of the chemical application equipment.

Figure 2:
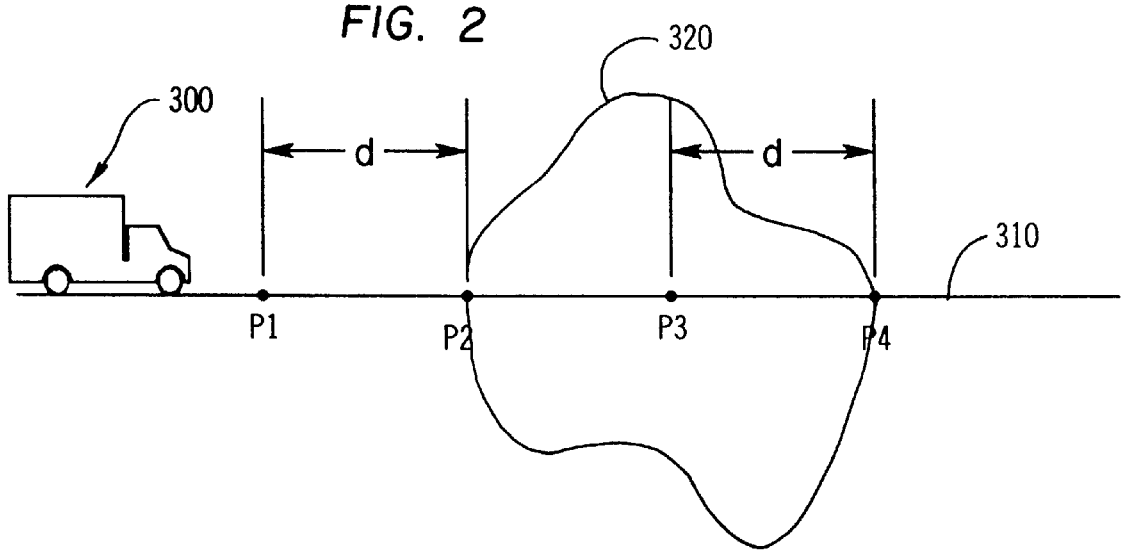
FIG. 2 is a diagrammatic illustration of a chemical application vehicle applying a chemical to a prescription area of a field, which illustrates features of the present invention.

FIG. 2 illustrates a field prescription area 320 to which vehicle 300 having system 100 installed is to apply chemicals at a variety of rates. As illustrated, vehicle 300 travels along path 310 into and out of area 320. To get the "look ahead" distance d, an operator of vehicle 300 can enter a value using input device 230. This distance can also be obtained by calculation and without operator intervention when the carrier rate is known from the Rx map. Using the look ahead distance and the position and bearing information, controller 210 continuously or periodically looks ahead by retrieving from the Rx map or data base the desired rate for the injected chemicals for a position the distance d in front of the current position of the vehicle, and the desired rate for the carrier at the current vehicle position. The desired chemical application rate for the injected chemicals is then commanded at the current position of vehicle 300, in order to achieve the desired rate for the position in the field the distance d ahead of the vehicle. In preferred embodiments, the desired rate is commanded by controlling injectors 140 to inject the chemical into the carrier fluid at the desired rate.

Referring to FIG. 2, prior to vehicle 300 reaching point P1, which is the distance d in front of point P2 at an edge of field prescription area 320, application system 100 will look ahead and see a desired injector application rate of zero. If vehicle 300 has just begun its application task, the application rate of zero will be commanded. When vehicle 300 reaches point P1, system 100 will look ahead and command the non-zero desired rate for the injected chemicals corresponding to point P2 for the injected channels. Because of the inherent delay between commanding and realizing a chemical application rate, when application vehicle 300 reaches point P2 the corresponding desired rate will be realized.

During travel from point P1 to point P3, the desired rate is repetitively updated and used to control system 100. Controller 190 commands the desired rates for the injected channels a distance d ahead their corresponding intended positions. Because point P4 is at the edge of prescription area 320, when vehicle 300 passes point P3, system 100 will look ahead and see a null or zero rate. Using the look ahead function, controller 190 could issue a command to shut off injectors 140.

In order to prevent application of chemicals outside of prescription area 320, if position determining device 220 indicates that vehicle 300 has left area 320, then application controller 210 commands that the flow controller 190 turn off pump 130. Thus, if vehicle 300 re-enters prescription area 320 and pump 130 is turned back on, system 100 will already be primed with chemicals and application will begin immediately at the boundary without a delay of the look-ahead distance d.

Figure 3:
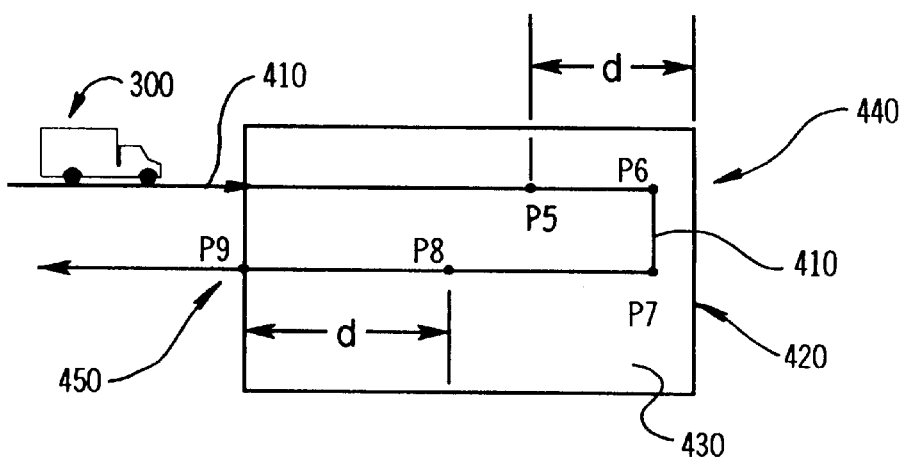
FIG. 3 is a diagrammatic illustration of a chemical application vehicle applying a chemical to a prescription area of a field, which illustrates other features of the present invention.

FIG. 3 illustrates vehicle 300 travelling along path 410 which enters and exits at side 450 of prescription area 430 bordered by boundary 420. Throughout the prescription area, system 100 operates as described above with reference to FIGS. 1 and 2. For example, when vehicle 300 passes point P5 a distance d ahead of prescription area boundary 420, system 100 will look ahead the distance d and see a non-valid rate (i.e., a null value or a negative value) corresponding to the area outside of prescription area 430 at side 440. As described above, to prevent the injectors from being prematurely turned off, system 100 will hold the last known valid rate until another valid rate is found. When vehicle 400 turns around between points P6 and P7, system 100 will look ahead back into prescription area 430 and command the corresponding rate.

While traveling between points P7 and P8, system 100 will repetitively update and command the desired injected chemical application rate corresponding to the position ahead of vehicle 300 by the distance d. After vehicle 300 passes point P8 on path 410, it will look ahead and see a non-valid rate corresponding to the area outside of boundary 420 on side 450. As before, rather than commanding this non-valid rate, system 100 preferably continues to command the last known good rate until another good rate is found. While still commanding the last known good rate, upon vehicle 300 exiting prescription area 430 at point P9, controller 190 of system 100 turns off carrier pump 130 so that chemicals are not applied outside of the desired prescription area. Of course, if desired, controller 190 can control pump 130 and injectors 140 to spray out the remaining chemicals in the system upon completion of the application project.

Figure 4:
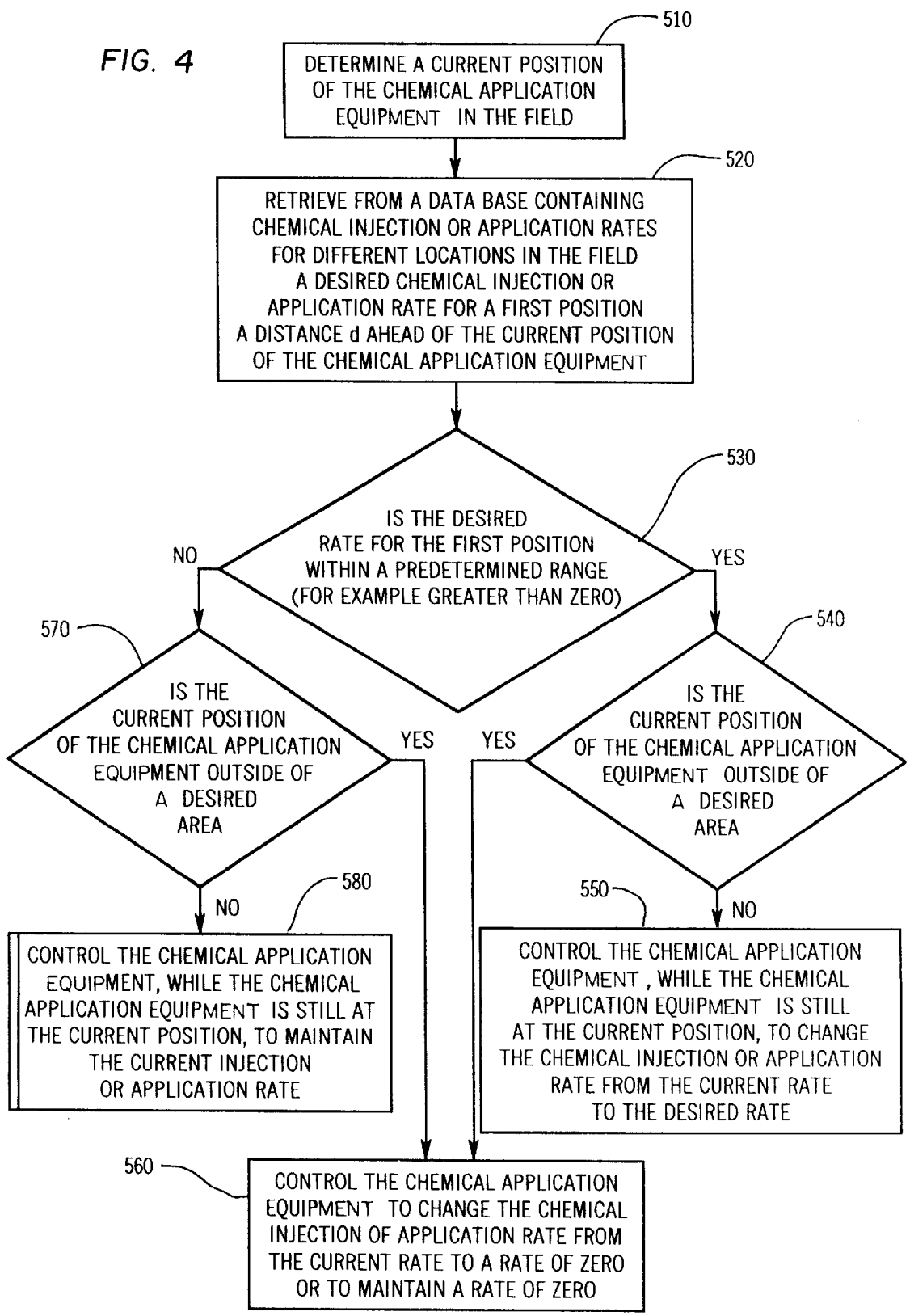
FIG. 4 is a flow diagram illustrating a method of applying a chemical to a prescription area of a field in accordance with the present invention.

FIG. 4 is a block diagram illustrating one preferred chemical application method of the present invention as discussed above with reference to FIGS. 1–3. As illustrated in block 510, the current position of the chemical application equipment in the field is determined. Next, as illustrated in block 520, the desired chemical application rate for a first position a distance d ahead of the current position of the equipment is determined for the injector channels, and the desired carrier rate is determined at the current position for the carrier channel. In preferred embodiments, this determination is made by retrieving the desired chemical application rate for this look ahead position from a look-up table.

As shown at block 530, it is determined whether the desired rate is valid or within a predetermined range. Typically, negative rates are considered invalid. If the desired rate is within the predetermined range, and if the current position of the chemical application equipment is within a desired area corresponding to the prescription area as determined at block 540, the chemical application equipment is controlled while at the current position to change the chemical injection rate or application rate from the current rate the desired rate. This is illustrated in block 550. Typically, changes to the chemical application rate are implemented by controlling the rate at which chemicals are injected into the carrier fluid.

If the desired rate is outside of the predetermined range, and if the current position of the chemical application equipment is within the desired area corresponding to the prescription area as determined at block 570, the chemical application equipment is controlled while at the current position to maintain the current chemical injection rate. This is illustrated at block 580. Regardless of whether the desired rate is within the predetermined range, if the chemical application equipment is outside of the desired area, the equipment is controlled to change the chemical application rate to zero or to maintain an application rate of zero. This is typically implemented by turning off the application system carrier pump 130.

When system 100 is injecting, the system keeps track of each injection channel 140 in one foot increments. Each time a new position is ascertained or at some predetermined interval, the rate being applied is stored in device 240 for each foot of the distance traveled during that update. For example, if the vehicle traveled 16 feet with a rate of 35 Oz/Acre, the system would store this 35 Oz/Acre information 16 times. After each update, the system looks back a distance d and records in device 240 the current position and the rate that was being commanded or implemented by the flow controller a distance d behind the current position. Therefore, using the application scenario illustrated in FIG. 3 as an example, as vehicle 300 approaches point P9, the data recording device repeatedly records its current position and the correlated chemical injection or application rate commanded a distance d behind its current position. When recording, the system will also track the flow of the carrier from tank 110. This is important as the injected chemical will only flow when the carrier flows. When the carrier is flowing, the recording function operates as described above. When the carrier is off (due to the vehicle being outside the prescription carrier area or the boom master control in the vehicle being turned off, the rates being tracked are held. When the switch is turned back on again, the system records the fact that whatever is still in the boom is sprayed out. In other words, if the driver is injecting and turns off the boom master switch, then moves the vehicle to a point outside the injected area and continues to spray by turning the boom master switch back on, the system will record that the sprayer applied injected chemical outside the prescription area or injection zone for a distance of d feet.

Although the present invention has been described with reference to preferred embodiments, workers skilled in the art will recognize that changes may be made in form and detail without departing from the spirit and scope of the invention.

What is claimed is:

1. A method of applying a chemical to an agricultural field, the method comprising:

determining a current position of chemical application equipment used to apply the chemical to the field;

retrieving from a data base containing a plurality of chemical application rates for different locations in the field a desired chemical application rate for a first position a distance d ahead of the current position of the chemical application equipment;

controlling the chemical application equipment, while the chemical application equipment is approximately at the current position, to change the chemical application rate from a current application rate to the desired application rate if the desired application rate is within a predetermined range, and controlling the chemical application equipment to maintain the current application rate if the desired application rate is outside of the predetermined range, wherein controlling the chemical application equipment further comprises controlling the chemical application equipment to change the chemical application rate from the current application rate to the desired application rate if the desired application rate is greater than or equal to zero, and controlling the chemical application equipment to maintain the current application rate if the desired application rate is less than zero; and recording in a data storage device, while the chemical application equipment is at the current position, the current position and a commanded or implemented chemical application rate corresponding to a second position a distance d behind the current position of the chemical application equipment.

2. The method of claim 1, wherein controlling the chemical application equipment, while the chemical application equipment is approximately at the current position, further includes controlling the chemical application equipment to change the chemical application rate from the current chemical application rate to an application rate of zero if the current position of the chemical application equipment is outside of a desired area.

3. The method of claim 2, wherein the steps of determining, retrieving and controlling are repeated for each of a plurality of positions in the field as the chemical application equipment is moved across the field.

4. The method of claim 3, wherein controlling the chemical application equipment to change the chemical application rate includes controlling an injector which injects the chemical into a carrier fluid to thereby control the chemical application rate.

5. The method of claim 3, wherein controlling the chemical application equipment to change the chemical application rate includes controlling a carrier pump which pumps a carrier fluid with which the chemical is mixed to thereby control the chemical application rate.

6. A system for applying a chemical to an agricultural field, the system comprising:

position determining means for determining a current position of chemical application equipment used to apply the chemical to the field;

chemical application rate determining means for determining a desired chemical application rate for a first position in the field a distance d ahead of the current position of the chemical application equipment;

control means for controlling the chemical application equipment, while the chemical application equipment is approximately at the current position, to change the chemical application rate from a current application rate to the desired application rate if the desired application rate is within a predetermined range, and for controlling the chemical application equipment to maintain the current application rate if the desired application rate is outside of the predetermined range, wherein the control means controls the chemical application equipment to change the chemical application rate by controlling an injector which injects the chemical into a carrier fluid to thereby control the chemical application rate; and a data storage device adapted to record, while the chemical application equipment is at the current position, the current position and a commanded or implemented chemical application rate corresponding to a second position a distance d behind the current position of the chemical application equipment.

7. The system of claim 6, wherein the control means controls the chemical application equipment, while the chemical application equipment is approximately at the current position, to change the chemical application rate from the current chemical application rate to an application rate of zero if the current position of the chemical application equipment is outside of a desired area.

8. The system of claim 7, wherein the control means controls the chemical application equipment, while the chemical application equipment is approximately at the current position, to change the chemical application rate from the current application rate to the desired application rate if the desired application rate is greater than or equal to zero, and controls the chemical application equipment to maintain the current application rate if the desired application rate is less than zero.

9. The system of claim 8, wherein the control means further controls the chemical application equipment to change the chemical application rate by controlling a carrier pump which pumps a carrier fluid with which the chemical is mixed to thereby control the chemical application rate.

* * * * *